United States Patent
Knepler (10) Patent No.: US 7,163,126 B2
(45) Date of Patent: Jan. 16, 2007

(54) HEATED WATER CONTROL SYSTEM, METHOD, AND APPARATUS

(75) Inventor: John T. Knepler, Springfield, IL (US)

(73) Assignee: Bunn-O-Matic Corporation, Springfield, MI (US)

( * ) Notice: Subject to any disclaimer, the term of this patent is extended or adjusted under 35 U.S.C. 154(b) by 473 days.

(21) Appl. No.: 10/779,896

(22) Filed: Feb. 17, 2004

(65) Prior Publication Data

US 2005/0178792 A1 Aug. 18, 2005

(51) Int. Cl.
*B67D 5/08* (2006.01)

(52) U.S. Cl. ............... 222/52; 222/1; 222/639; 222/640; 222/644; 222/146.2; 99/280

(58) Field of Classification Search .......... 222/1, 222/52, 63–64, 129.1, 129.2, 129.3, 129.4, 222/646, 61, 639, 640, 644, 146.2, 641; 99/280–283
See application file for complete search history.

(56) References Cited

U.S. PATENT DOCUMENTS

| | | | |
|---|---|---|---|
| 4,917,005 A | 4/1990 | Knepler | |
| 4,978,833 A * | 12/1990 | Knepler | 392/449 |
| 5,019,690 A * | 5/1991 | Knepler | 219/400 |
| 5,377,299 A | 12/1994 | Anson et al. | |
| 5,434,392 A * | 7/1995 | Belinkoff | 219/689 |
| 5,623,574 A | 4/1997 | Knepler | |
| 5,647,055 A | 7/1997 | Knepler | |
| 5,671,113 A | 9/1997 | Knepler | |
| 5,901,634 A * | 5/1999 | Vancamp et al. | 99/281 |

\* cited by examiner

*Primary Examiner*—Frederick C. Nicolas
(74) *Attorney, Agent, or Firm*—Barnes & Thornburg LLP (57) ABSTRACT

An apparatus, system, and method for precise dispensing of a desire volume of liquid. The present system allows incorporation of brewer control and a faucet in an accurate volume dispensing system. The dispensing apparatus is used in combination with a beverage maker and includes a liquid reservoir with a level sensor associated therewith for sensing a liquid level in the reservoir. An inlet tube communicates with the reservoir and a constant line pressure source. An inlet valve positioned along the inlet tube is controlled by a controller. The controller also controls an outlet valve communicating with an outlet tube extending from the liquid reservoir. The controller operates the outlet valve to remain open for a time period which is the longer of an initial set time period and one or more refill periods. The controller may also controllably adjust the outlet time period by monitoring for reductions in the time the inlet valve remains open.

43 Claims, 5 Drawing Sheets

HEATED WATER CONTROL SYSTEM, METHOD, AND APPARATUS

BACKGROUND AND SUMMARY

Current beverage making apparatuses employ a variety of techniques to control the volume of liquid dispensed during a beverage making process. It is desirable to have a preselected volume of beverage dispensed to prevent "short potting," a condition where less than the intended volume of beverage is dispensed. As an example, but not by way of limitation, during the production of coffee, a short pot would mean that an insufficient volume of water would be combined with coffee grounds, resulting in a coffee beverage having a resulting flavor that is different than intended, and thus not having the desired taste.

It is desirable to have a combination of accurately controlled liquid dispensing in a system that allows effective brewing. Other accurate volume dispensing systems known in the art include a siphon system in which the brewed volume is determined by a timed opening of an electric valve in a cold water supply path. The siphon system uses a flow regulator to assure that the rate of flow into a holding basin is constant with varying pressure from the water supply. The holding basin is large enough to contain at least a full selected brew cycle volume of water. Eventually, the water in the basin will displace hot water from the tank into the brew funnel. Once the water level in the tank falls below the highest level of the outlet tube, the siphon action takes over and drains the tank to a "siphon level" point. This system has the advantage that the finished brew volume in the carafe is always maintained, even if the outlet path is partially obstructed with lime, mineral deposits, or other materials. A disadvantage is the difficulty in implementation of a pulse brew. If a valve is placed between the tank outlet and the sprayhead, and it is closed during the siphon portion of the brew, then flow will not restart when the valve is opened again. The result is a short volume in the finished brew. Also, additional volume may be dispensed in the subsequent brew if the tank had not been drained to the siphon level. Another disadvantage is the consequence of adding a separate outlet path for a faucet to dispense hot water from the tank. If water were to be drawn from the faucet during a brewing cycle, the amount of water taken would be subtracted from the finished brew.

Another system known in the art, referred to as a gravity system, opens an outlet valve in an outlet tube for a predetermined period based on a known flow rate from the tank. A problem with this system is that as lime and mineral deposits accumulate inside the outlet tube, the flow-rate out the tube decreases which results in the a smaller volume of liquid being dispensed within the predetermined period.

Briefly, and in accordance with the foregoing, disclosed is an apparatus, kit, system, and method for accurate dispensing of a desired volume of liquid. The present system overcomes prior limitations that prevent incorporation of, for example, the addition of a faucet for drawing liquid from a liquid reservoir. The dispensing apparatus is used in combination with a beverage making machine and includes a liquid reservoir with a level sensor associated therewith for sensing a liquid level in the reservoir. An inlet tube communicates with the reservoir to provide a liquid flow thereto. A flow regulator or constant line pressure source provides liquid flow into the reservoir at a predetermined flow rate. An inlet valve positioned along the inlet tube and is provided and is controlled by a controller. The controller also controls an outlet valve communicating with an outlet tube extending from a the liquid reservoir. The controller operates the outlet valve to remain open for a time period which is the longer of an initial set time period and an extension time period. The extension time period is calculated as the sum of the initial time period and one or more refill periods, the duration of which is more fully explained below.

Also disclosed is a method for controlling a beverage dispenser to dispense a desired volume of liquid which includes the following steps. First, a first inlet time and first outlet time are set. These two first times may be set either as factory presets or during an initial calibration process. A second outlet time is initially set to be equal to the first outlet time. During subsequent brewing cycles, the outlet valve is opened for the second outlet time. During the brew cycle, the inlet valve is opened or iteratively opened by the controller in response to a level sensor sensing a liquid level in the reservoir has fallen below a preselected reservoir level and closed by the controller in response to the level sensor sensing the liquid level has risen at least to the preselected reservoir level. Simultaneously the controller monitors the total time the inlet valve remains open during the brewing cycle. This total time is defined as the second inlet time. If the difference between the first inlet time and second inlet time is greater than an adjustment trigger time, the controller increases the second outlet time by some increment for subsequent brewing cycles.

Additional features and embodiments will become apparent to those skilled in the art upon consideration of the following detailed description of drawings.

BRIEF DESCRIPTION OF THE DRAWINGS

The present disclosure will be described hereafter with reference to the attached drawings which are given as a non-limiting example only, in which.

The exemplification set out herein illustrates embodiments of the disclosure that is not to be construed as limiting the scope of the disclosure in any manner.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

The present disclosure provides an apparatus, system and method for controlled dispensing of liquid which may be used with a beverage maker or beverage brewer. Terms including beverage, brewed, brewing, brewing substance, beverage preparation material, brewed liquid, and brewed beverage as may be used herein are intended to be broadly defined as including, but not limited to, the brewing of coffee, tea and any other beverages. This broad interpretation is also intended to include, but is not limited to any process of dispensing, infusing, steeping, reconstituting, diluting, dissolving, saturating or passing a liquid through or otherwise mixing or combining a beverage substance with a liquid such as water without limitation to the temperature of such liquid unless specified. This broad interpretation is also intended to include, but is not limited to beverage substances such as ground coffee, tea, liquid beverage concentrate, powdered beverage concentrate, flaked, granular, freeze dried or other forms of materials including liquid, gel, crystal or other forms of beverage or food materials to obtain a desired beverage or other food product.

Figure 1:
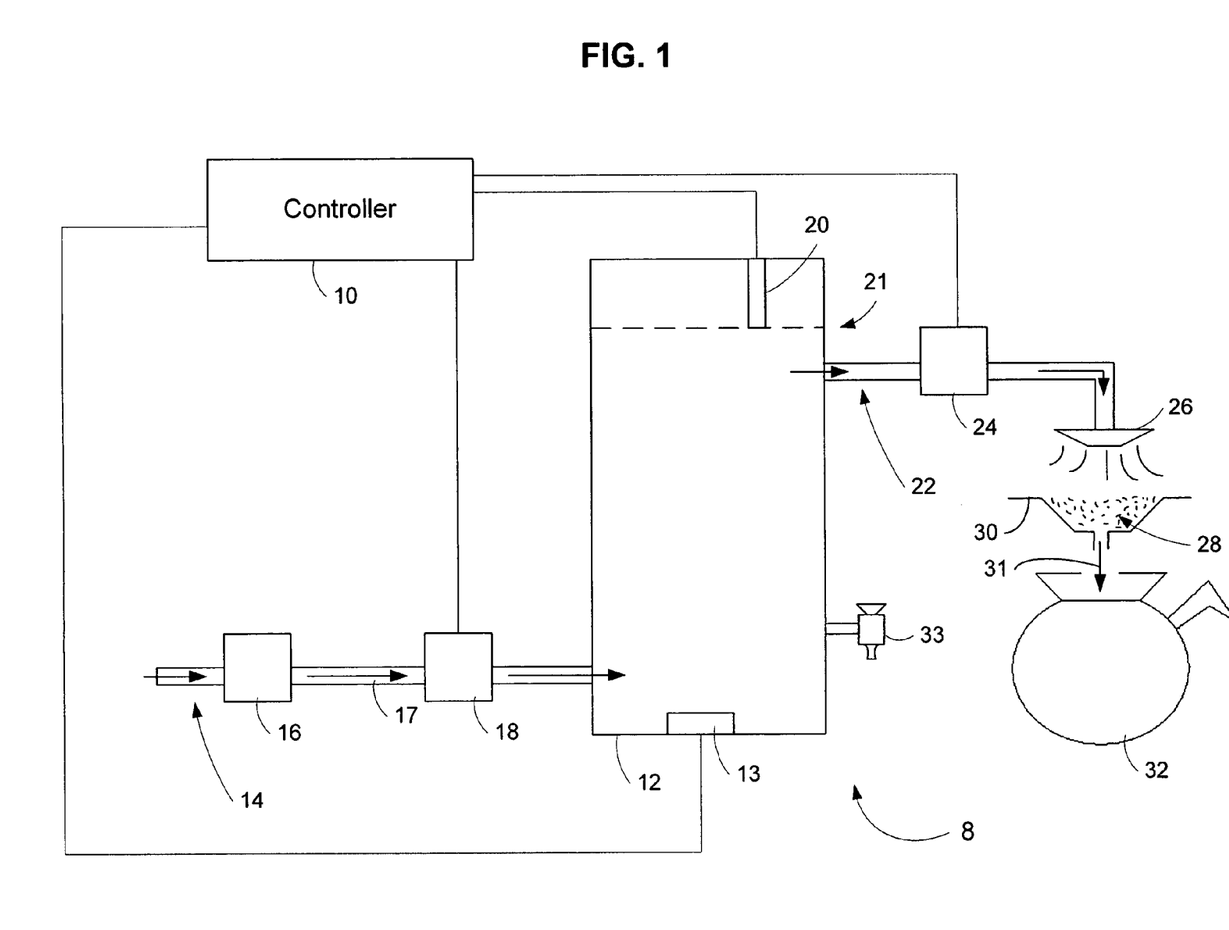
FIG. 1 is a simplified diagram of an apparatus for controlled dispensing of a volume of liquid.

As shown in FIG. 1, an apparatus for dispensing liquid or dispensing assembly 8 includes a controller 10 coupled to various components or controllable devices associated with an inlet liquid or water delivery assembly which may include a liquid reservoir 12 and which controls or receives information from at least a portion of a beverage maker that is associated with the apparatus 8. When apparatus 8 is used in beverage machines that produce a heated beverage, such as coffee, tea, or soup, liquid reservoir 12 may include a heater, such as heating element 13 associated therewith to heat the liquid to a desired temperature. Such a heating element is coupled and controlled by controller 10. Alternatively, for ambient temperature liquid dispensing apparatuses, no heating element may be needed. The present disclosure may also be used for cooled liquid dispensing in which case a cooling element would be used instead of a heating element. An inlet tube 14 is coupled to and communicates with liquid reservoir 12 for dispensing liquid into liquid reservoir 12. A flow regulator 16 is coupled with inlet tube 14. Flow regulator 16 maintains a predetermined flow rate for the liquid through entry section 17 toward liquid reservoir 12. Any flow regulator of suitable construction for maintaining the predetermined flow rate may be used. Flow regulator 16 may be coupled to controller 10 for controllably adjusting the flow rate when the particular application may so require, or may be operated independently of controller 10.

Figure 3:
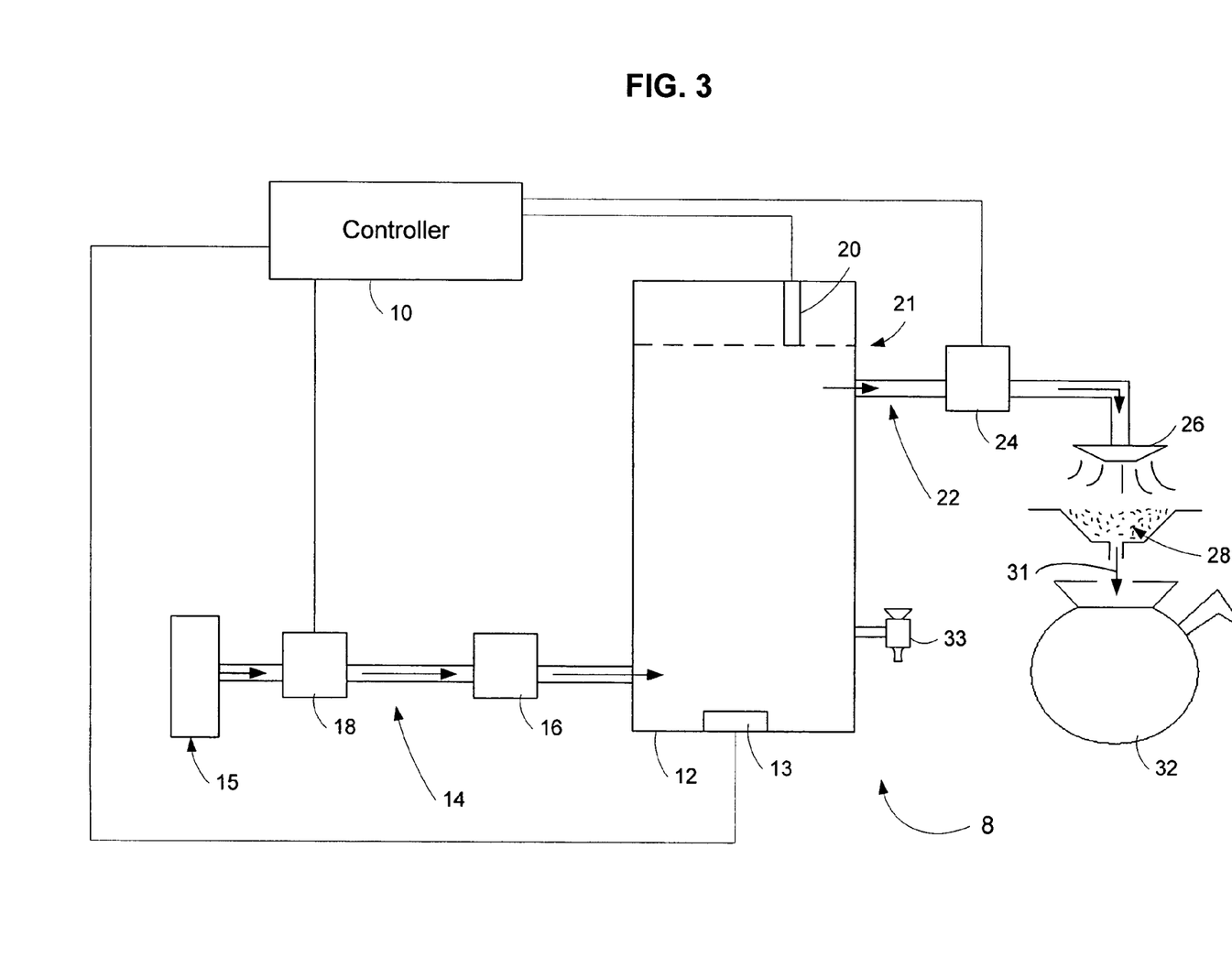
FIG. 3 is a simplified diagram of another embodiment of an apparatus for controlled dispensing of a volume of liquid having a constant line pressure source component.

Instead of using flow regulator 16, a constant line pressure source 15 may be used as shown in FIG. 3, such as a pressurized line found in many buildings. Buildings or other facilities may provide line pressure at generally predictable and repeatable flow rates. Therefore, the present apparatus need not actually have a flow regulator if the inlet tube 14 is connected to a constant line pressure source.

Figure 2:
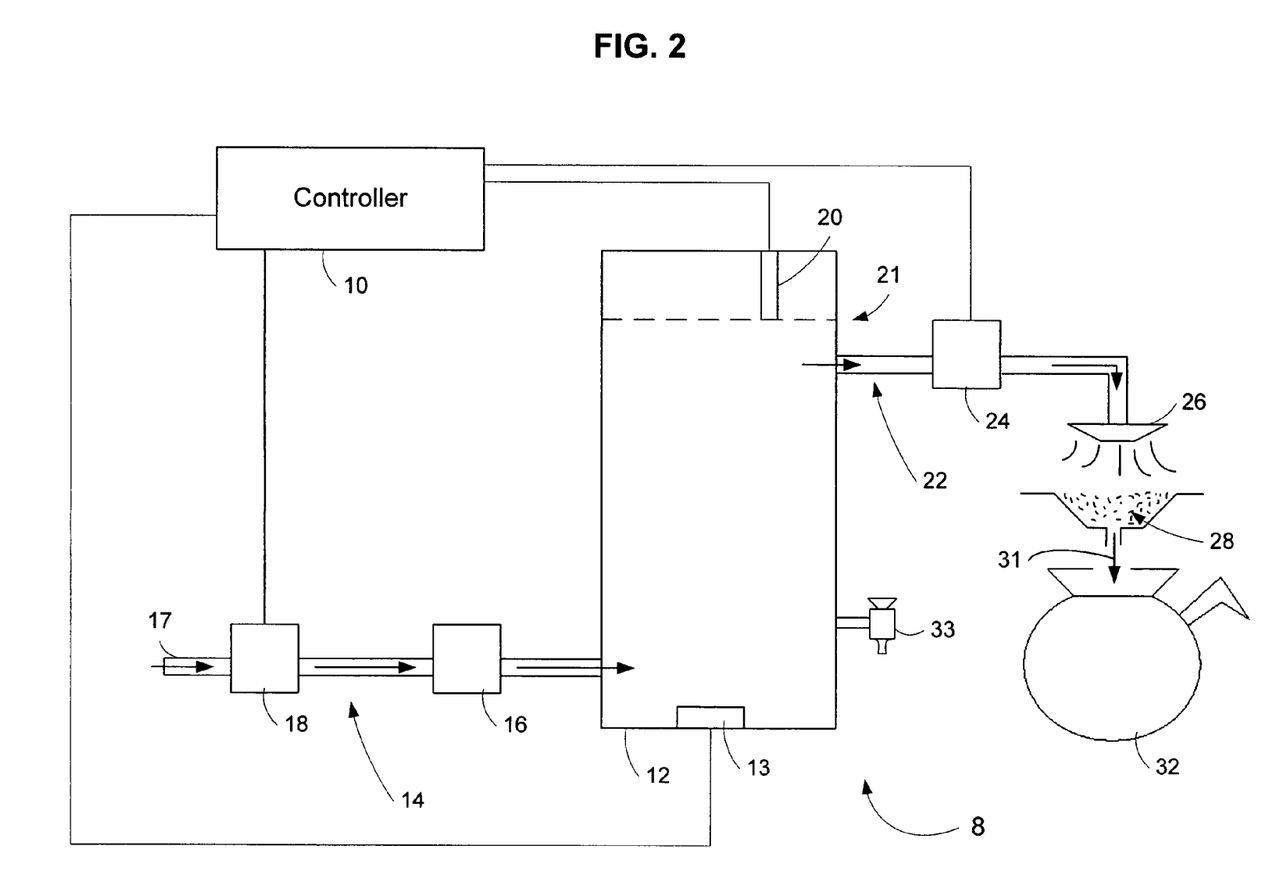
FIG. 2 is a simplified diagram of another embodiment of an apparatus for controlled dispensing of a volume of liquid.

An inlet valve 18 is positioned to communicate with inlet tube 14 between flow regulator 16, liquid reservoir 12 as shown in FIG. 1, between some liquid source and flow regulator 16 as shown in FIG. 2, or between the line pressure source 15 and reservoir 12 as shown in FIG. 3. Controller 10 operates inlet valve 18 to open and close to selectively allow and prevent flow therethrough. Controller 10 is configured to log how long inlet valve 18 remains open during each operation. This interval is used to generally accurately calculate the volume of liquid entering liquid reservoir 12 as described further below or in a method to monitor outflow rate, also as described below.

Associated with reservoir 12 is a level sensor 20 which senses a level of liquid in reservoir 12. As an example, level sensor 20 is activated when the liquid level reaches a predetermined level 21, shown as a dashed line in FIGS. 1–3. Any suitable level sensor may be used including a conductance based level sensor positioned within the interior of reservoir 12, a capacitive level sensor, sonic level sensor, optical level sensor or weight driven level sensor associated with reservoir 12.

Liquid is permitted to flow out of reservoir 12 via outlet tube 22. An outlet valve 24 is associated with outlet tube 22 and is coupled to and controllably operated by controller 10. When outlet valve 24 is open, liquid can pass out of outlet tube 22. As an example, outlet tube 22 may lead to a spray head 26 to be distributed over beverage making material 28 positioned in a brew funnel 30 to allow the liquid, for example heated water, to contact the beverage making material, for example coffee grounds, to make a desired beverage such as coffee. The brewed beverage 31 is then passed into a container such as a coffee carafe 32 for distribution and consumption. A faucet 33 may also be provided in association with reservoir 12 for selective dispensing of liquid directly therefrom.

In one embodiment of operation, controller 10 maintains the liquid level in the reservoir 12 generally at predetermined level 21 which is higher than outlet tube 22 by opening and closing inlet valve 18. When a filling or brewing cycle is initiated, controller 10 opens initially closed outlet valve 24 in the outlet tube 22 between reservoir 12 and sprayhead 26. Liquid flows at a generally constant rate based on the difference in height between the sprayhead 26 and the liquid level in reservoir 12. Because this rate is generally constant, a desired volume initially can be set using a fixed predetermined timed opening of outlet valve 24. However, this initially set time will no longer be sufficient as lime and mineral deposits accumulate along the interior surface of outlet tube 22 and reduce the flow rate through the outlet tube, thus requiring more to pass the same quantity of water through the outlet tube.

Apparatus 8 mitigates the effect of a partially obstructed outlet tube 22 by extending the time inlet valve 18 and outlet valve 24 remain open. Inlet valve 18 serves to keep the liquid level in reservoir 12 at the selected level 21 so that the flow rate out of outlet tube 22 is generally constant if constant flow rate is desired. This is accomplished by calculating the volume of liquid dispensed by monitoring the volume refilled. The volume refilled may be calculated by storing the total of the time intervals the inlet valve 12 remains open during a brew cycle. The sum of the intervals can be multiplied by the preselected flow rate to calculate, within acceptable tolerances and accurate volume of liquid that has refilled reservoir 12. This refilled volume will equal the volume dispensed because controller 10 operates inlet valve 18 to remain open for a time sufficient to iteratively raise or keep the liquid level in reservoir 12 at level 21. Controller 10 may operate inlet valve 18 to delay re-closing by a minimum preselected refill period to avoid fluttering in inlet valve 18, such as a one-second minimum refill period, although other periods may be used as well. In operation, the liquid level in reservoir 12 may rise slightly above level 21 until the minimum refill period has expired. In this manner, apparatus 8 generally equalizes the volume refilled with the volume dispensed, and because the volume refilled can be calculated, the volume dispensed is accurately calculated as well.

Figure 4:
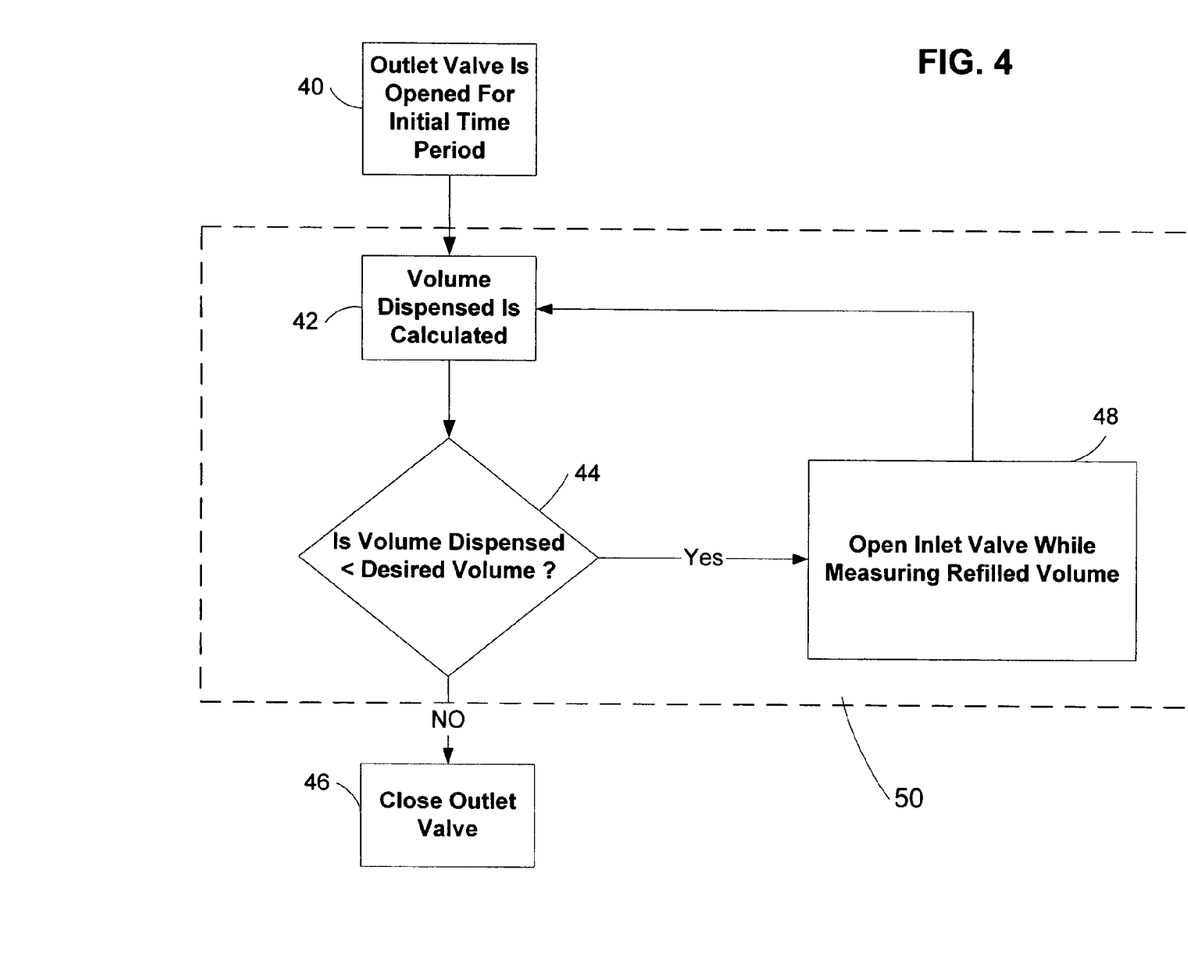
FIG. 4 is a simplified flow diagram of a method of controlled dispensing of a volume of liquid.

FIG. 4 is a flowchart depicting controller 10 operation for this embodiment of the liquid dispensing control. In step 40, after initial setup and filling of reservoir 12 to level 21, outlet valve 24 is opened for an initial time period set to dispense a predetermined volume. The predetermined volume will depend on the application so may be, for example, one full coffee carafe in a single coffee pot beverage maker, or multiple batch sizes for a commercial coffee maker. The initial time period would be generally sufficient to dispense the predetermined volume unless material has accumulated to obstruct the interior of outlet tube 22. This initial period may be factory set or set during a calibration procedure. In step 42, the volume dispensed is calculated based on the refill volume which is calculated as described above. In step 44, a comparison is made by comparing the volume dispensed to the predetermined volume. If the volume dispensed is not less than the predetermined volume, i.e. the volume dispensed is equal to or slightly greater than the predetermined volume, outlet valve 24 is closed in step 46, and the brewing cycle is complete. If the volume dispensed is less than the predetermined volume, in step 48, controller 10 operates outlet valve 24 to remain open and inlet valve 18 is opened to allow entry of additional liquid into reservoir 12 and subsequently out of outlet tube 22. The volume dispensed is recalculated in step 42, and comparison 44 is again made. Loop 50 continues until the predetermined volume is dispensed. The time period during which loop 50 continues is referred to hereinafter referred to as a refill period. The sum of the initial time period and one or more refill periods is hereinafter referred to as the extension time period.

An indicator may also be provided on apparatus 8, which is coupled to, and controllably operated by, controller 10 to indicate that the extension time period is longer than the initial time period which would mean there is some degree of obstruction in outlet tube 22. This indicator may be in the form of an indicator light, audible signal, message displayed on a visual display coupled to the controller or communication to a remote monitoring device in close proximity to the apparatus or at a geographically remote location. The message generally indicates preventative maintenance is needed and alerts appropriate operators to take some action. Controller 10 may also be programmed to operate to lockout further operation of apparatus 8 should the difference between the initial time period and extension time period exceed a threshold or a selected limit, such as for example, 2 minutes, although other selected limits may be set or selected.

Controller 10 can be any type of electronic controller suitable for controlling operation of the mechanical and electrical components of apparatus 8. Controller 10 could for example, include a microprocessor-based controller of known construction, a circuit board, or some other circuitry and may include suitable programming to operate the apparatus 8.

It is envisioned that a software module may be used to retrofit an existing beverage machine to provide for the controlled liquid dispensing described above. The term "module" referenced in this disclosure is meant to be broadly interpreted and broadly cover various types of software code including but not limited to routines, functions, objects, libraries, classes, members, packages, procedures, methods, or lines of code together performing similar functionality to these types of coding. The retrofit may include, but is not limited to, adding a new controller module or component, updating an existing controller with the software module through any available programming method, including flashing a controller's memory, replacing a chip, replacing a circuit board, or copying and running software code on memory accessible to a controller's microprocessor. The software module may be included as part of a retrofit kit for updating an existing dispensing machine to include the functionality describe above. It is also envisioned that kit may be used to retrofit an existing beverage maker that lacks a flow regulator. Thus an alternative version of the kit may include a flow regulator and sufficient components and instructions for connecting it to the inlet line and a software module.

Figure 5:
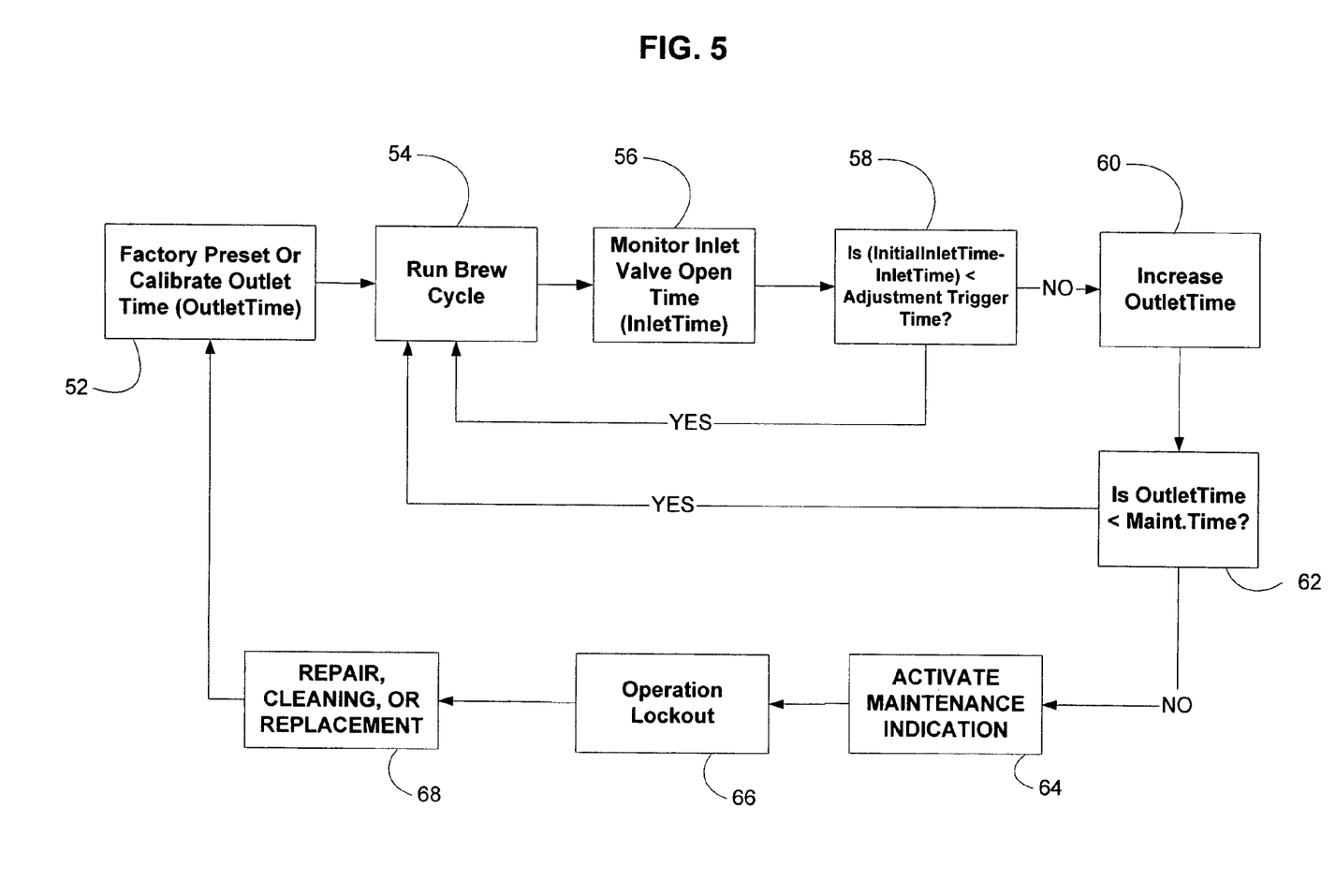
FIG. 5 is a simplified flow diagram of another embodiment of a method of controlled dispensing of a volume of liquid.

Another embodiment of a method for controlling liquid volume dispensing using the present apparatus is generally shown in FIG. 5. In this embodiment, the apparatus or kit incorporating the components shown in FIGS. 1–3 and described herein arrive at the location where the beverage making is to take place. If the apparatus is an embodiment without a flow regulator 16, the inlet tube 14 is put in communication with a constant line pressure source 15. If the apparatus includes a flow regulator, the apparatus can put in communication with any liquid source. During the initial setup, the controller 10 will be programmed with a preset time that the outlet valve 24 should remain open for a desired volume to be dispensed. This preset value may be overridden using a calibration process, such as, for example, the following calibration process. A user operates the liquid dispenser to begin dispensing liquid until the desired volume has been dispensed, at which time the user operates the apparatus to stop dispensing. The controller records the amount of time the outlet valve 24 was open during this calibration process and stores the time as initial outlet time. Such a calibration step may help to set the apparatus to operate with the specific conditions at the installation site. This helps set the apparatus for any variation in other operating characteristics, such as, but not limited to, water pressure. As shown in FIG. 4, in this setup step 52, this first outlet time, shown the flowcharts as the variable "Outlet Time" is stored in the controller 10.

A controller suitable for such calibration is described in U.S. Pat. No. 5,375,508 issued in the name of the same inventor as the present application and assigned to the same assignee as the present application, which is hereby incorporated by reference in its entirety. Similarly, the controller 10 is preset with, or monitors the inlet valve 18 during a calibration to determine a first inlet time or initial inlet time which is the total time the inlet valve 18 is open during the initial brewing cycle. A second outlet time, to be discussed in more detail below, is initially set to be equal to the first outlet time.

With the initial outlet time value determined, the apparatus is operating during step 54 in the following manner. The liquid passing through the apparatus will be referred to hereafter as water although it is understood that other liquids may be used. Reservoir 12 is filled to at least level 21 at which point controller 10 starts a dispensing cycle by opening outlet valve 24 to allow water to flow out from outlet tube 22. Level sensor 20 detects the water level in the reservoir 12 has fallen below level 21 which causes controller 10 to open inlet valve 18 to allow additional water to replenish the volume in the reservoir 12. When controller 10 receives a signal from level sensor 20 that the water has again risen to at least level 21, controller 10 controllably operates inlet valve 18 to close. This process may repeat during the time period the outlet valve 24 is open, which during this first cycle, is the same as the preset or calibrated outlet time value. As referred to in step 56, throughout the cycle, the controller 10 monitors the total time inlet valve 18 was open and stores this value as a second inlet time or "Inlet Time."

In step 58, a check is performed that compares Inlet Time to Initial Inlet Time. The Inlet Time after the early life of the product may decrease for the following reason. As lime or other deposits build up in outlet tube 22, the volume of water dispensed will decrease for a given time outlet valve 24 remains open. The volume of replenished water for this given time will likewise decrease. This reduced replenishment volume is caused by the inlet valve 18 remaining open for a shorter period as controlled by the level sensor 20/inlet valve 18 control procedure described above. Therefore a decreased volume out of the outlet valve 24 causes a decrease in the Inlet Time. By increasing the Outlet Time, more volume must be replenished which means Inlet Time is increased. Thus increasing Outlet Time causes Inlet Time to generally adjust back to the Initial Input Time.

This operation allows for adjustment of the dispensing time to provide generally dispensing the same volume of water from cycle to cycle, even after mineral deposits have built up in outlet tube 22. If the difference between the Initial Inlet Time and the Inlet Time during the most recent brew cycle is less than a preselected adjustment trigger time, controller 10 is configured to run subsequent cycles without any adjustment to the timing variables. The adjustment trigger time may be factory set or be a percentage of the Initial Inlet Time, such as 80% of the Initial Input time. As shown in step 60, if the difference between the Initial Inlet Time and the Inlet Time is not less than the adjustment trigger time, the controller 10 increases the Outlet Time by some preselected increment. As a result, during the next brew cycle, the Inlet Time will increase and be above the adjustment trigger time, allowing the beverage maker to operate normally for a number of subsequent cycles, albeit with slightly longer brew times than associated for the initial brew cycle.

In step 62, the controller 10 checks whether the Outlet Time is greater than a preselected maintenance alert trigger. At some point during the life of the beverage maker, the incremental increases in the Outlet Time have caused the brewing process to take progressively longer to the point of inconvenience to users or potential detriment to the machine or process. As shown in step 64, if Outlet Time is greater than preselected maintenance time, the controller activates a maintenance indicator, such as, for example, a light, sound, or visual message or any other type of indicator as previously described above. Controller 10 may also lockout operation in step 66 until the dispensing apparatus is repaired, cleaned or reset (step 68). After such repair, cleaning, or resetting, the mineral deposits have been removed, and the beverage machine can once again be reset to factory settings or be put through a calibration process 52 to reestablish the first inlet and first outlet time values.

While this disclosure has been described as having exemplary embodiments, this application is intended to cover any variations, uses, or adaptations using the general principles set forth herein. It is envisioned that those skilled in the art may devise various modifications and equivalents without departing from the spirit and scope of the disclosure as recited in the following claims. Further, this application is intended to cover such departures from the present disclosure as come within the known or customary practice within the art to which it pertains.

What is claimed:

1. An apparatus for controlled beverage dispensing in a beverage maker, the apparatus comprising:
    a controller for controlling operation of at least a portion of the beverage maker;
    a liquid reservoir;
    an inlet tube communicating with the liquid reservoir;
    a constant line pressure source communicating with the inlet tube;
    an inlet valve communicating with the inlet tube positioned between the constant line pressure source and the liquid reservoir and coupled to the controller;
    a level sensor associated with the liquid reservoir to detect at least one beverage level in the liquid reservoir, the level sensor being coupled to the controller;
    an outlet tube communicating with the liquid reservoir;
    an outlet valve communicating with the outlet tube and coupled to the controller; and
    the controller operating the outlet valve to remain open for a time period, the time period being a longer of an initial time period and an extension time period, the extension time period being the sum of the initial time period and one or more refill periods.

2. The apparatus of claim 1 further comprising the constant line pressure source being a flow regulator.

3. The apparatus of claim 1 further comprising a faucet communicating with the liquid reservoir.

4. The apparatus of claim 1 further comprising an indicator coupled to the controller for indicating the time period is greater than the initial time period.

5. The apparatus of claim 4 further comprising having the indicator be a message indicating preventative maintenance may be required.

6. A beverage dispenser including an apparatus for controlled beverage dispensing, a controller being coupled to the beverage dispenser to controllably operate the beverage dispenser to dispense a predetermined volume of liquid, the apparatus comprising:
    a liquid reservoir;
    an inlet tube communicating with the liquid reservoir;
    a flow regulator communicating with the inlet tube;
    an inlet valve communicating with the inlet tube positioned between the flow regulator and the liquid reservoir and coupled to the controller;
    a level sensor associated with the liquid reservoir to detect at least one beverage level in the liquid reservoir, the level sensor being coupled to the controller;
    an outlet tube communicating with the liquid reservoir;
    an outlet valve communicating with the outlet tube and coupled to the controller; and
    the controller operating the outlet valve to remain open for a time period, the time period being a longer of an initial time period and an extension time period, the extension time period being the sum of the initial time period and one or more refill periods.

7. The beverage dispenser of claim 6 further comprising a faucet communicating with the liquid reservoir.

8. The beverage dispenser of claim 6 further comprising an indicator coupled to the controller for indicating the time period is greater than the initial time period.

9. The beverage dispenser of claim 8, further comprising having the indicator be a message indicating preventative maintenance may be required.

10. A method for dispensing a desired volume of liquid using a beverage dispenser, the method comprising the steps of:
    providing a controller for controlling operation of at least a portion of the beverage maker;
    providing a liquid reservoir;
    providing an inlet tube communicating with the liquid reservoir;
    providing a constant line pressure source communicating with the inlet tube;
    providing an inlet valve communicating with the inlet tube;
    providing a level sensor associated with the liquid reservoir to detect at least one beverage level in the liquid reservoir, the level sensor being coupled to the controller;

providing an outlet tube communicating with the liquid reservoir;

providing an outlet valve communicating with the outlet tube and coupled to the controller;

opening the outlet valve for an initial time period to dispense a volume of liquid; and performing a routine until the desired volume has been dispensed, comprising the steps of:

(a) calculating the volume of liquid dispensed;

(b) performing a comparison of the volume of liquid dispensed to the desired volume of liquid and in response to the comparison resulting in the volume of liquid dispensed being equal to or greater than the desired volume, closing the outlet valve; and (c) in response to the volume of liquid dispensed being less than the desired volume of liquid, opening the inlet valve for a refill period, the refill period ending when the level sensor senses a liquid level in the liquid reservoir has reached a preselected level.

11. The method of claim 10, further comprising the step of filling the liquid reservoir to a preselected level prior to opening the outlet valve for the initial time period to dispense the volume of liquid.

12. The method of claim 10, further comprising having the line pressure source be a flow regulator.

13. The method of claim 12, further comprising having the step of calculating the volume of liquid dispensed be performing the steps of:

operating the flow regulator to maintain a preselected liquid flow rate in a entry section of the inlet tube, the entry section being a section of the inlet tube between the flow regulator and the inlet valve;

during operation of the inlet valve, measuring each time interval the inlet valve remains open;

calculating the volume of liquid dispensed by multiplying a sum of the time intervals by the preselected liquid flow rate.

14. The method of claim 13, further comprising having the refill period end when both the level sensor senses a liquid level in the liquid reservoir has reached a preselected level and a minimum preselected refill period has expired.

15. The method of claim 10, further comprising providing a faucet in communication with the beverage reservoir, and selectively using the faucet to dispense the liquid.

16. The method of claim 10, further comprising providing an indicator in communication with the controller for indicating a time period is greater than the initial time period, the time period being the sum of the each refill period and the initial time period.

17. The method of claim 16, further comprising the indicator being a message indicating that preventative maintenance may be needed.

18. The method of claim 16, further comprising controllably operating the outlet valve to operate in a pulse brewing mode during dispensing.

19. The method of claim 10, further comprising locking out further dispensing of liquid if the difference between the time period and initial time period is greater than a selected limit, the time period being the sum of each refill period and the initial time period.

20. The method of claim 10, further comprising operating the outlet valve in a pulse-brew mode during dispensing.

21. A system in combination with a beverage dispenser for controlled beverage dispensing, the system comprising:

a controller for controlling operation of at least a portion of the beverage maker;

a liquid reservoir;

a dispensing assembly including an inlet tube communicating with the liquid reservoir, a constant line pressure source communicating with the inlet tube, an inlet valve communicating with the inlet tube positioned between the constant line pressure source and the liquid reservoir and coupled to the controller, a level sensor associated with the liquid reservoir to detect at least one beverage level in the liquid reservoir, the level sensor being coupled to the controller, an outlet tube communicating with the container, an outlet valve communicating with the outlet tube and coupled to the controller, the controller operating the outlet valve to remain open for a time period, the time period being a longer of an initial time period and an extension time period, the extension time period being the sum of the initial time period and one or more refill periods; and an apparatus for producing a beverage communicating with the dispensing assembly for receiving the liquid from the dispensing assembly and controllably dispensing a beverage therefrom in response to a control signal from the controller.

22. The system of claim 21 further comprising:

a volume of beverage preparation material retained in the apparatus for producing a beverage; and a container for combining a volume of liquid dispensed by the dispensing apparatus with the volume of beverage preparation material to create a beverage.

23. The system of claim 21 further comprising a faucet in communication with the dispensing assembly.

24. The system of claim 21 further comprising an indicator for indicating the time period is greater than the initial time period.

25. The system of claim 24 further comprising the indicator being a message indicating preventative maintenance may be required.

26. The system of claim 22 further comprising the liquid being water, the beverage preparation material being ground coffee, and the beverage being coffee.

27. A kit for use with beverage maker, the beverage maker comprising a dispensing assembly including an inlet tube communicating with the liquid reservoir, an inlet valve communicating with the inlet tube and coupled to a controller, a level sensor associated with the liquid reservoir to detect at least one beverage level in the liquid reservoir, the level sensor being coupled to the controller, an outlet tube communicating with the container, and an outlet valve communicating with the outlet tube and coupled to the controller, the kit comprising:

a flow regulator to be associated with the inlet tube and coupled to the controller; and a software module for operating the controller to operate the outlet valve to remain open for a time period, the time period being a longer of an initial time period and an extension time period, the extension time period being the sum of the initial time period and a refill period.

28. The kit of claim 27, the software module further being operative to operate the outlet valve in a pulse brew mode.

29. A kit for use with beverage maker, the beverage maker including an inlet tube communicating with the liquid reservoir, a constant line pressure source communicating with the inlet tube, an inlet valve communicating with the inlet tube and coupled to the controller, a level sensor associated with the liquid reservoir to detect at least one beverage level in the liquid reservoir, the level sensor being coupled to a controller, an outlet tube communicating with the container, an outlet valve communicating with the outlet tube and coupled to the controller, the kit comprising:

a software module for operating the controller to operate the outlet valve to remain open for a time period, the time period being a longer of an initial time period and an extension time period, the extension time period being the sum of the initial time period and one or more refill periods.

30. The kit of claim 29, the software module being further operative to operate the outlet valve in a pulse brew mode.

31. An apparatus for controlled beverage dispensing in a beverage maker, the apparatus comprising:

a controller for controlling operation of at least a portion of the beverage maker;
a liquid reservoir;
an inlet tube communicating with the liquid reservoir;
a constant pressure liquid source;
an inlet valve communicating with the inlet tube positioned between the constant pressure liquid source and the liquid reservoir and coupled to the controller;
a level sensor associated with the liquid reservoir to detect at least one beverage level in the liquid reservoir, the level sensor being coupled to the controller;
an outlet tube communicating with the liquid reservoir;
an outlet valve communicating with the outlet tube and coupled to the controller; and
the controller operating to adjust an outlet time for operating the outlet valve to remain open after a brew cycle in response to detecting an obstruction in the outlet tube by monitoring the time the inlet valve remains open during a dispensing cycle.

32. The apparatus of claim 31 further comprising the constant line pressure source being a flow regulator.

33. The apparatus of claim 32 further comprising a faucet communicating with the liquid reservoir.

34. The apparatus of claim 31 further comprising an indicator coupled to the controller for indicating the time period is greater than the initial time period.

35. The apparatus of claim 34 further comprising having the indicator be a message indicating preventative maintenance may be required.

36. A method for dispensing a desired volume of liquid using a beverage dispenser, the method comprising the steps of:

providing a controller for controlling operation of at least a portion of the beverage dispenser;
providing an inlet water delivery assembly, the inlet water delivery assembly having an inlet valve for controlling water flow through the water delivery assembly and coupled to the controller;
providing a level sensor associated with the inlet water delivery assembly to detect at least one liquid level in the water delivery assembly, the level sensor being coupled to the controller;
providing an outlet tube communicating with the inlet water delivery assembly;
providing an outlet valve communicating with the outlet tube and coupled to the controller;
setting a first outlet time;
setting a first inlet time;
setting the second outlet time to initially be equal to the first outlet time;
during each brew cycle, opening the outlet valve for the second outlet time to cause liquid to be begin to dispense out from the inlet water delivery assembly;
iteratively opening the inlet valve in response to the level sensor sensing the liquid level in the inlet water delivery assembly has fallen below a preselected level and closing the inlet valve in response to the level sensor sensing the liquid level has risen at least to the preselected level, while simultaneously having the controller monitor a second inlet time, the second inlet time being a total time the inlet valve remains open during that brewing cycle; and
in response to the difference between the first inlet time and second inlet time being greater than an adjustment trigger time, increasing the second outlet time by an increment.

37. The method of claim 36, further comprising the steps of:

providing a liquid reservoir of the inlet water delivery assembly;
providing an inlet tube of the inlet water delivery assembly, the inlet tube communicating with the liquid reservoir and the inlet valve; and
providing a constant line pressure source of the inlet water delivery assembly, the constant line pressure source communicating with the inlet tube.

38. The method of claim 36, further comprising the step of: in response to the second outlet time being greater than a preselected maintenance time, activating a maintenance indicator.

39. The method of claim 36, further comprising setting the adjustment trigger time to be a percentage of the first inlet time.

40. The method of claim 36, further comprising the step of: in response to the second outlet time being greater than a preselected maintenance time, having the controller lock out operation of the beverage dispenser.

41. The method of claim 36, the step of setting a first outlet time being setting the outlet time to be a factory preset time.

42. The method of claim 36, the step of setting a first outlet time being setting the outlet time to a time determined during a calibration process to be a time needed to dispense a desired volume.

43. The method of claim 36, further comprising the step of operating the outlet valve in a pulse brew mode.

* * * * *